United States Patent [19]

Pinteric

[11] Patent Number: 5,537,264
[45] Date of Patent: Jul. 16, 1996

[54] METHOD FOR OPTIMALLY SELECTING MEDIA TRANSFER RATES FOR DIFFERENT DATA HEADS BASED ON INDIVIDUAL DATA HEAD PERFORMANCE

[75] Inventor: Frank Pinteric, Somis, Calif.

[73] Assignee: Micropolis Corporation, Chatsworth, Calif.

[21] Appl. No.: 334,568

[22] Filed: Nov. 4, 1994

[51] Int. Cl.$^6$ .......................... G11B 27/36; G01R 33/12
[52] U.S. Cl. ............................................ 360/31; 324/212
[58] Field of Search ..................... 324/210, 212; 369/58, 53, 55; 360/31, 45, 46, 65, 61, 53

[56] References Cited

U.S. PATENT DOCUMENTS

| | | | |
|---|---|---|---|
| H588 | 2/1989 | Latham, II | 360/65 |
| 4,799,112 | 1/1989 | Bremmer et al. | 360/31 |
| 4,853,633 | 8/1989 | Matsumoto | 324/210 |
| 4,862,078 | 8/1989 | Kawabata | 324/212 |
| 5,087,992 | 2/1992 | Dahandeh et al. | 360/31 |
| 5,121,262 | 6/1992 | Squires et al. | 360/46 |
| 5,226,027 | 7/1993 | Bakx | 369/58 |
| 5,258,876 | 11/1993 | Danner et al. | 360/45 |

*Primary Examiner*—Aristotelis Psitos
*Assistant Examiner*—Patrick Wamsley
*Attorney, Agent, or Firm*—Poms, Smith, Lande & Rose

[57] ABSTRACT

A method for increasing data storage on a hard disk drive is disclosed herein, the method including determining a capacity goal for the disk drive, partitioning the usable disk surface on the disk drive into regions, and calculating a transfer rate based on the capacity goal and the usable disk space. The rate at which data may be transferred is then increased by a first selected quantity and/or decreased by a second selected quantity to establish a higher and/or lower transfer rate. For multiple data heads used in an individual disk drive unit, a first group of heads is partitioned from the remaining heads based on a particular selection criteria, and the remaining heads are arranged into a second group. The first group of data heads then operates at a higher transfer rate than the second group of data heads, and an algorithm for reading and writing data at the different rates is created.

19 Claims, 4 Drawing Sheets

METHOD FOR OPTIMALLY SELECTING MEDIA TRANSFER RATES FOR DIFFERENT DATA HEADS BASED ON INDIVIDUAL DATA HEAD PERFORMANCE

FIELD OF THE INVENTION

This invention relates to magnetic data storage devices, and more particularly to increasing the amount of data stored on such devices.

BACKGROUND OF THE INVENTION

Data is commonly stored on magnetic disks in computer applications. These disks are divided into multiple concentric tracks and data is stored along these tracks as individual magnetized portions of the tracks. The disk drive unit uses multiple read/write heads to transmit data to and from the magnetic disks, and the characteristics of these heads determine overall drive efficiency. More efficient heads may write and read data more effectively, allowing greater data storage and easier retrieval.

A problem with read/write heads is that different heads in a single disk drive may be of varying qualities. A single head manufacturer may create heads which, while meeting specifications for reading and writing capacity, are not as efficient as other heads used in the same drive. Consequently, when using multiple heads having varying levels of effectivity, writing may take more time than anticipated, and a disk may store less data than if a head had greater effectiveness, or could handle data at a higher speed or with greater density of data. Further, if data is recorded using a head having excellent read/write capacities at a slower rate, data will not be stored on the disk although the capability to do so exists.

Past solutions to data transfer problems have been to increase the data transferred through the heads uniformly, as if all heads operated identically. The problem with these methods, as outlined above, is that variations in head quality cause data transfer problems, decreasing yields for the entire head disk assembly (HDA).

SUMMARY OF THE INVENTION

Accordingly, it is an object of the current invention to provide a system where read/write head variations do not decrease the overall storage capacity of magnetic disks in a disk drive.

It is a further object of the invention to provide a method for determining and easily quantifying the quality of various data heads to improve the quantity of data stored on disks.

In accordance with the present invention, there is provided a method for increasing data storage on a hard disk drive. The method includes determining a capacity goal for the disk drive, partitioning the usable disk surface on the disk drive into regions, and calculating a transfer rate based on the capacity goal and the usable disk space. The transfer rate is then increased by a first selected quantity, and/or decreased by a second selected quantity to establish a higher and/or lower transfer rate. For the multiple data heads used in an individual disk drive unit, a first group of heads is partitioned from the remaining heads based on a particular selection criteria. The remaining heads are then arranged into a second group. The first group of data heads then operates at a higher transfer rate than the second group of data heads.

More broadly, the invention encompasses a method for increasing data storage which includes stressing multiple data heads, evaluating the quality of the heads, partitioning the head based on performance, and reading and writing data based on the quality of the data heads.

Other objects, features, and advantages of the present invention will become more apparent from a consideration of the following detailed description and from the accompanying drawings.

DESCRIPTION OF THE PREFERRED EMBODIMENT

Figure 1:
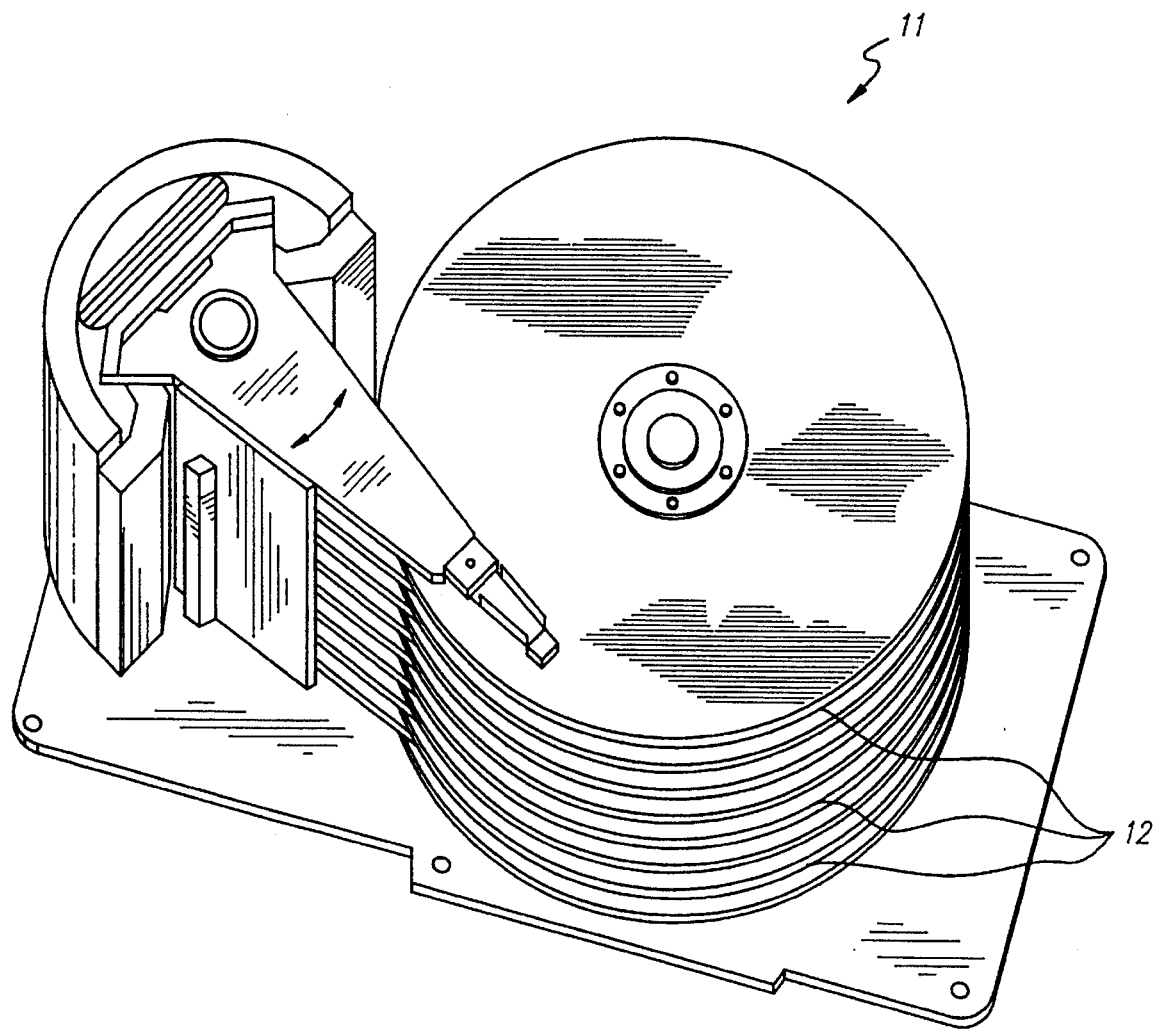
FIG. 1 illustrates a disk drive typical of those employing the inventive method disclosed herein.

The current invention is intended for implementation in a hard disk drive unit 11 as shown in FIG. 1. While not exclusively limited to the hard disk drive unit 11 shown therein, it depicts a typical multiple disk-hard disk drive system. Magnetic disks 12 are used to store data, and the hard disk drive unit 11 utilizes the inventive method disclosed herein.

Figure 2:
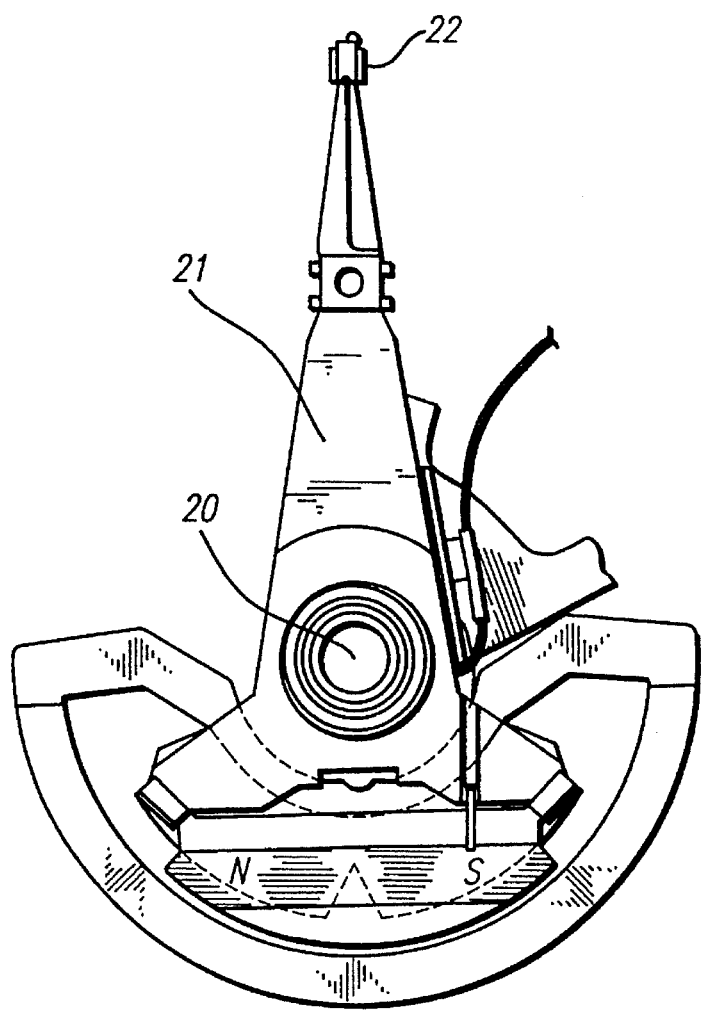
FIG. 2 presents a view of a head positioner used to move data heads across the magnetic disks.
Figure 5:
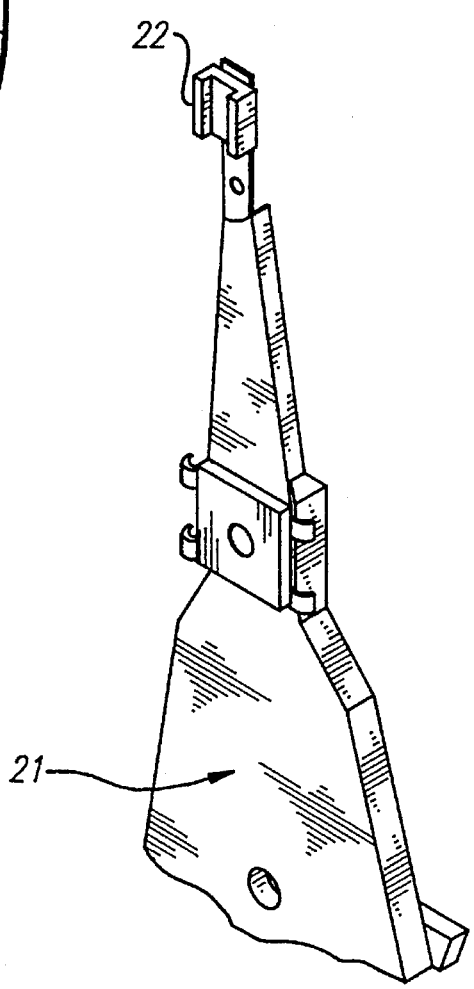
FIG. 5 presents the location of the data head on the arm.

FIG. 2 illustrates a head positioner assembly having an arm 21 used to mechanically drive the head 22 around a pivot point 20. The arm sweeps over the magnetic disks 12 and data is written and read using head 22 by magnetically altering the disks. FIG. 5 presents a close view of head 22.

Figure 3:
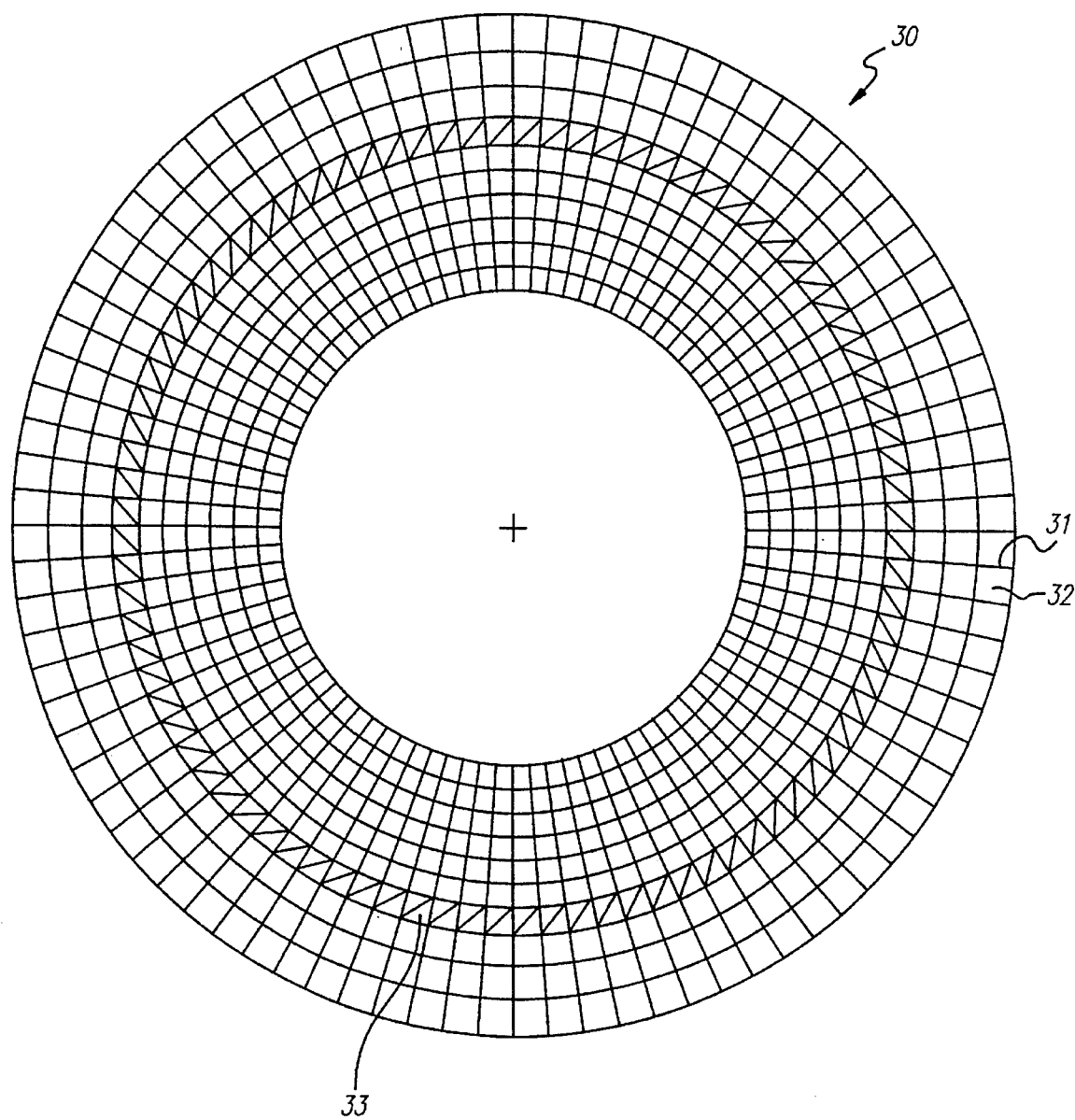
FIG. 3 shows a typical magnetic disk.

FIG. 3 shows a typical magnetic disk 30 used in conjunction with the disclosed invention. Data is stored in concentric circles on magnetic disk 30. The disk illustrated in FIG. 3 is used in conjunction with an embedded servo, meaning that data is interspersed with servo information; however, the invention disclosed herein may be used in conjunction with a dedicated or hybrid servo system, which stores data differently on the magnetic disk 30.

User data section 32 stores data, while servo information axis 31 stores servo data. A track 33 consists of multiple levels of servo data and user information.

Figure 4:
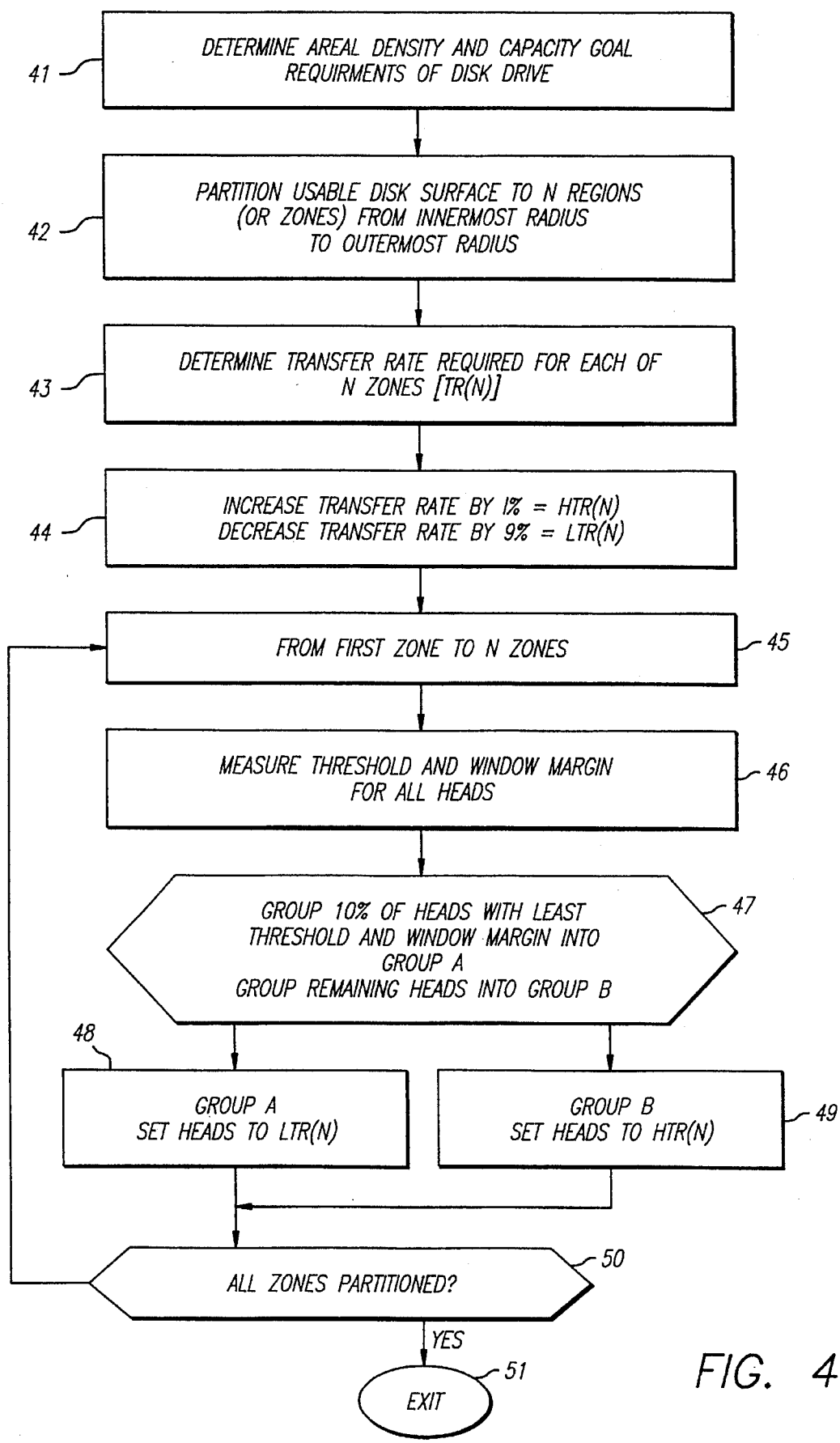
FIG. 4 illustrates the steps of the current invention.

FIG. 4 presents a flow diagram of the current invention. The disk 30 has a fixed surface area on which one ordinarily skilled in the art of disk drives can determine the maximum amount of data which can be stored in accordance with the other physical aspects of the unit. The areal density (amount of data per unit area) and capacity goal requirements (number of bits of data storable on the unit) are estimated in determination step 41. Partitioning step 42 thereupon segments the usable area on the disk 30 into multiple regions, or zones, from the innermost radius to the outermost radius. Transfer rate determination step 43 then calculates a transfer rate for each zone based on the number of zones, from partitioning step 42, the density on the disk, and the speed at which the disks rotate. For example, if a single disk can hold 12 megabytes (Mbytes) of data, and the areal density of the disk is 0.5 Mbytes per square inch, and 100 data zones exist on each of 100 tracks on a having 6 square inches of area on the disk, and the disk rotates at 25 cycles per second, then the transfer rate is approximately 3.0 Mbytes per second. This transfer rate is increased by a small percentage, the preferred increase being 1 per cent, to establish a higher transfer rate HTR in transfer rate variance step 44. The transfer rate is also decreased by a relatively large percentage, the preferred decrease being 9 per cent, to establish a lower transfer rate LTR in transfer rate variance step 44. The overall effect is to increase reliability with a given amount of storage, or to increase storage capacity with the same reliability. If the transfer rate is increased by a large amount, such as five to ten per cent, the corresponding yield from the head drive assembly would be poor. Increasing the transfer rate forces a greater capacity on the drive heads than is typically required, and if all heads were to run at a one per cent higher transfer rate, the entire drive would have a one per cent higher capacity.

The transfer rate for all zones is calculated by looping through the following steps. The first zone is evaluated in counting step 45. The threshold and window margins for the heads are calculated in margin calculation step 46. During self test of the head drive assembly, the window margin and amplitude threshold are calculated. Window margin determination entails moving data within the data recovery window both early and late or, viewed alternatively, it is the latitude in head positioning along the track which may be accommodated. The difference between amount of data moved early and the amount of data moved late is the window margin. For example, on a good head, the recovery window can be moved 10 bits early and 10 bits late, and the head will perform well. On a poor head, data can only be moved 5 bits early and 5 bits late. The total number of bits moved early and late is the window margin.

Amplitude threshold is measured during the rechannel portion of testing. A qualify level is determined for data pulses, and pulses of greater and less amplitude are then transmitted through the head. Pulses received which are above the qualify level are counted, while pulses received which are below the qualify level are not counted. If the drive can still operate with the qualify level increased to 20 per cent above normal and decreased to 20 per cent below normal, then the drive has a threshold margin of 40. If the increase is to 10 per cent above normal and decrease to 10 per cent below normal, then the drive has only 20 as its threshold margin.

The two measures, window margin and threshold margin, are used to determine quality of the heads. Those heads having the lowest window and threshold margins are downgraded. Typical implementation has shown that only ten percent of the heads in a single drive may be downgraded. Thus, a drive having 28 heads may have as many as 3 heads downgraded. The ten per cent of the heads having the lowest margins, window and threshold, are then grouped together into a first group, or group A, while the remaining heads are grouped together into a second group, or group B, in grouping step 47.

The heads in group A are formatted at the lower transfer rate, LTR, in lower group set step 48. Higher group set step 49 formats all heads having the higher threshold and window margins at the higher transfer rate HTR.

For all zones, or regions, on the drive, the transfer rate is altered as shown in the preceding steps. Once all regions have been partitioned in complete evaluation step 50, the steps are complete and an algorithm is written to read and write data for the individual heads for all regions at the respective rates determined from the method.

Alternate embodiments of the current invention may include writing data at more than two rates, depending on the quality of the data heads, as well as only raising or lowering the transfer rate rather than both raising and lowering the rates.

It is noted in passing that a disk drive often has a fairly large number of disks, such as 5, 10, or even 15, and both the upper and lower surfaces are employed for recording, so that the number of heads is normally twice the number of disks. Normally, data is being written to or read from only one head. It is also noted that it is customary to write more data in outer tracks which are longer, than on inner tracks which have a lesser circumference, so that the density of data along the tracks is relatively constant. With a constant speed of disk rotation, this means that data is written at a higher rate where the heads are transferring data with the outer tracks, as compared with data transfer with the inner tracks. In accordance with the present invention, this change in data transfer rates is carried over to accommodate variations in the data handling capabilities of the various heads in the disk drive.

It is further noted that data is being stored on disk drives in progressively higher densities, with 3½ inch drives having more than a gigabyte or one billion bytes (8 binary digits or "bits" to a "byte") of data not being uncommon. It is also noted that in some cases, separate heads are mounted on an arm for reading, and for writing, respectively, and the present invention is, of course, applicable to such systems.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method for increasing data storage on a hard disk drive, comprising the steps of:

determining a capacity goal for the disk drive;

partitioning usable disk surface on the disk drive into a plurality of regions;

calculating a transfer rate based on information received from the determining step and the partitioning step;

increasing the transfer rate by a first selected quantity to establish a higher transfer rate;

decreasing the transfer rate by a second selected quantity to establish a lower transfer rate;

establishing a first group of a plurality of data heads based on a selection criterion;

arranging all remaining heads into a second group;

operating said first group of data heads at the lower transfer rate; and running said second group of data heads at the higher transfer rate.

2. The method for increasing data storage on a hard disk drive of claim 1, wherein said particular selection criterion comprises having a combined threshold margin and window margin less than .all remaining heads.

3. The method for increasing data storage on a hard disk drive of claim 2, wherein said establishing step consists of separating a predetermined percentage of the plurality of data heads having the combined threshold margin and window margin less than all remaining heads, and wherein said arranging step consists of placing the remaining heads into the second group.

4. A method for increasing data storage on a hard disk drive, comprising the steps of:

stressing a plurality of data heads;

evaluating the quality of the plurality of data heads;

partitioning a predetermined number of the plurality of data heads based on an evaluation criteria for information received from the evaluation step; and reading and writing data for the predetermined number of data heads at a different rate than for the remainder of the heads based on the evaluation criteria.

5. The method for increasing data storage on a hard disk drive of claim 4, wherein the evaluating step comprises:

measuring a threshold margin for each of the plurality of data heads; and determining a window margin for each of the plurality of data heads.

6. The method for increasing data storage on a hard disk drive of claim 5, wherein the partitioning step comprises arranging a predetermined number of heads having lowest threshold margin and lowest window margin into a first group collecting the remaining heads into a second group.

7. The method for increasing data storage on a hard disk drive of claim 6, wherein the arranging step comprises placing ten per cent of the heads having lowest threshold margin and lowest window margin into the first group.

8. A method for increasing data storage on a hard disk drive, comprising the steps of:

stressing a plurality of data heads;

evaluating the quality of the plurality of data heads;

reading and writing data at first and second different rates using respectively different data heads based on the quality determined in said evaluating step.

9. The method for increasing data storage on a hard disk drive of claim 8, wherein said data reading and writing step comprises reading and writing data at a higher rate using the data heads having the best quality determined in said evaluating step.

10. The method for increasing data storage on a hard disk drive of claim 8, wherein said data reading and writing step comprises reading and writing data at a lower rate using the data heads having the worst quality determined in said evaluating step.

11. The method for increasing data storage on a hard disk drive of claim 9, wherein said data reading and writing step further comprises reading and writing data at a lower rate using the data heads having the worst quality determined in said evaluating step.

12. The method for increasing data storage on a hard disk drive of claim 11, further comprising the step of partitioning a predetermined number of the plurality of data heads based on information received from the evaluation step, wherein said partitioning step precedes both of the data reading and writing steps.

13. The method for increasing data storage on a hard disk drive of claim 12, wherein the evaluating step comprises:

measuring a threshold margin for each of the plurality of data heads; and determining a window margin for each of the plurality of data heads.

14. The method for increasing data storage on a hard disk drive of claim 13, wherein the partitioning step comprises:

arranging a predetermined number of heads having lowest threshold margin and lowest window margin into a first group; and collecting the remaining heads into a second group.

15. The method for increasing data storage on a hard disk drive of claim 14, wherein the arranging step comprises placing ten per cent of the heads having lowest threshold margin and lowest window margin into the first group.

16. A method for increasing data storage on a hard disk drive comprising the steps of:

evaluating the quality of a plurality of data heads regarding their capability to accurately record and/or read data from a magnetic medium at different data densities;

mounting said heads to read and/or write data from a plurality of magnetic disk surfaces on a single hard disk drive;

reading and writing data to said disks at a higher rate near the exterior of said disks and at a lower rate nearer to the center of said disks;

reading and/or writing data to said disks at different rates or densities for different heads having different capabilities, with the heads being at the same radial position on the respective disks with which the heads are associated.

17. The method for increasing data storage on a hard disk drive of claim 16, wherein said reading and/or writing step comprises:

calculating a transfer rate based on a capacity goal and usable disk surface on the disk drive;

increasing the transfer rate by a first selected quantity to establish a higher transfer rate;

decreasing the transfer rate by a second selected quantity to establish a lower transfer rate;

establishing a first group of heads based on a selection criteria;

arranging all heads into a second group;

operating said first group of heads at the higher transfer rate; and running said second group of data heads at the lower transfer rate.

18. The method for increasing data storage on a hard disk drive of claim 17, wherein said particular selection criteria comprises having a combined threshold margin and window margin less than all remaining heads.

19. The method for increasing data storage on a hard disk drive of claim 18, wherein said establishing step consists of separating a predetermined percentage of the plurality of data heads having the combined threshold margin and window margin less than all remaining heads, and wherein said arranging step consists of placing the remaining heads into the second group.

* * * * *